(12) United States Patent
Jia et al.

(10) Patent No.: US 9,992,118 B2
(45) Date of Patent: Jun. 5, 2018

(54) SYSTEM AND METHOD FOR OPTIMIZING TRANSPORTATION OVER NETWORKS

(71) Applicant: Veritas Technologies LLC, Mountain View, CA (US)

(72) Inventors: Yingsong Jia, Beijing (CN); Hongxing Guan, Beijing (CN); Xinbao Jin, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 399 days.

(21) Appl. No.: 14/524,656

(22) Filed: Oct. 27, 2014

(65) Prior Publication Data

US 2016/0119238 A1  Apr. 28, 2016

(51) Int. Cl.
*G06F 15/173* (2006.01)
*H04L 12/801* (2013.01)
(Continued)

(52) U.S. Cl.
CPC .......... *H04L 47/12* (2013.01); *H04L 43/0852* (2013.01); *H04L 47/36* (2013.01); *H04L 47/365* (2013.01)

(58) Field of Classification Search
USPC ....................................................... 709/224
See application file for complete search history.

(56) References Cited

U.S. PATENT DOCUMENTS 5,668,810 A  9/1997 Cannella, Jr.
5,727,159 A  3/1998 Kikinis
(Continued)

FOREIGN PATENT DOCUMENTS

EP  2398268 A1  12/2011
WO  0024192 A1  4/2000
(Continued)

OTHER PUBLICATIONS

Heys, Howard M., "Analysis of the Statistical Cipher Feedback Mode of Block Ciphers", IEEE Transactions on Computers, Jan. 2003, pp. 77-92, vol. 52, No. 1, IEEE Computer Society Washington, DC, USA.

(Continued)

*Primary Examiner* — Vivek Srivastava
*Assistant Examiner* — Hermon Asres
(74) *Attorney, Agent, or Firm* — Rory D. Rankin; Meyertons, Hood, Kivlin, Kowert & Goetzel, P.C.

(57) ABSTRACT

A system and method for efficient transfer of data over a network. A data source and a destination are coupled to one another via a network. The data source is configured to transmit data to the destination and determine a network latency associated with the transmission. In response to determining a first transmission parameter may not be optimized, the source is configured to modify the first transmission parameter and evaluate its effect on data throughput. The source may repeat such modifications as long as throughput is increased. Once the first transmission parameter is deemed optimized, the source may perform a similar procedure for a second transmission parameter. In various embodiments, the first transmission parameter may correspond to a packet size and the second transmission parameter may correspond to a number of streams being processed by the source.

20 Claims, 6 Drawing Sheets

(51) Int. Cl.
*H04L 12/26* (2006.01)
*H04L 12/805* (2013.01)

(56) References Cited

U.S. PATENT DOCUMENTS

| | | | |
|---|---|---|---|
| 5,848,070 | A | 12/1998 | Durvaux et al. |
| 5,848,352 | A | 12/1998 | Dougherty et al. |
| 5,987,518 | A | 11/1999 | Gotwald |
| 6,192,082 | B1 | 2/2001 | Moriarty et al. |
| 6,263,437 | B1 | 7/2001 | Liao et al. |
| 6,397,259 | B1 | 5/2002 | Lincke et al. |
| 6,659,860 | B1 | 12/2003 | Yamamoto et al. |
| 7,526,085 | B1 | 4/2009 | Bong |
| 7,787,447 | B1 | 8/2010 | Egan et al. |
| 8,713,300 | B2 | 4/2014 | Clifford et al. |
| 2003/0115447 | A1 | 6/2003 | Pham et al. |
| 2004/0153642 | A1 | 8/2004 | Plotkin et al. |
| 2005/0123003 | A1* | 6/2005 | Bordonaro .......... H04L 41/5009 370/516 |
| 2006/0062156 | A1 | 3/2006 | Stultz et al. |
| 2009/0125726 | A1 | 5/2009 | Iyer et al. |
| 2009/0257583 | A1 | 10/2009 | Schneider |
| 2010/0074253 | A1* | 3/2010 | Cheriyath .......... H04B 7/18506 370/389 |
| 2010/0174740 | A1 | 7/2010 | Ge |
| 2010/0246430 | A1* | 9/2010 | Egan .................... H04L 41/0823 370/252 |
| 2010/0250767 | A1* | 9/2010 | Barreto .................. H04L 69/16 709/231 |
| 2010/0274772 | A1 | 10/2010 | Samuels |
| 2013/0138800 | A1* | 5/2013 | Gelter ................. H04L 12/1881 709/224 |

FOREIGN PATENT DOCUMENTS

| | | |
|---|---|---|
| WO | 0106784 A2 | 1/2001 |
| WO | 2007118829 A1 | 10/2007 |
| WO | 2014035896 A2 | 3/2014 |

OTHER PUBLICATIONS

Extended European Search Report on European Application No. 12150971.5, dated May 8, 2012, 8 pages.
International Search Report and Written Opinion in International Application No. PCT/US2015/057429, dated Jan. 19, 2016, 9 pages.

* cited by examiner

SYSTEM AND METHOD FOR OPTIMIZING TRANSPORTATION OVER NETWORKS

BACKGROUND

Technical Field

This invention relates to the field of computer networks and, more particularly, to efficient transfer of data over a network.

Description of the Related Art

As computer memory storage and data bandwidth increase, so does the amount and complexity of data that businesses daily manage. A large portion of the data may include electronic documents, announcements, tasks, discussion topics, and so forth. Depending on the business value of this information, access to certain information may be secure and private. The contents of information servers and end-user systems may be backed up to a backup storage to prevent loss of data, especially for data identified as crucial data. In such a case, a dedicated server and storage subsystem may include a backup system.

Administering and supporting an information technology (IT) infrastructure on a large number of end-user systems presents a significant challenge. Generally speaking, an IT administrator develops a management system for data backup and data protection; data recovery, restore, and restart; archiving and long-term retention; and day-to-day processes and procedures necessary to manage a storage architecture. This management system includes strategies and policies for administering storage systems on computing devices. For example, a backup image may be automatically replicated or migrated from one location to a storage device at another location. This migration may be referred to as duplication of the backup image.

In some cases, the transfer of data from the backup server to the storage devices may be through a Fibre Channel (FC) link. A FC network protocol is generally implemented when a business accesses a large amount of information over SANs, mail servers, file servers and large databases. In addition, server virtualization is increasingly used. For example, hypervisors are able to provide guest operating systems with virtualized storage, accessible through a Fibre Channel network infrastructure. Additionally, an Ethernet protocol may be used to transfer information over global distances, to remote sites, or in clustered, low-latency compute environments. For example, the migration of a backup image from one backup server to a second backup server may utilize an Ethernet network.

As noted above, in some computing environments organizations may seek to replicate data from one location to another remote location over a network. For example, a backup from one location to a remote location may be desired. In such an environment, network latencies can have a serious impact on the performance of the replication process. Such network latencies may be due to propagation delay, network congestion, and/or processing delays. In some cases, the latency may be such that performance falls below what is desired or otherwise expected.

In view of the above, improved systems and methods for efficient transfer of data over a network are desired.

SUMMARY

Systems and methods for efficient transfer of data over a network.

In one embodiment, a computing system comprises a backup server and a client computer coupled to one another via a network, such as a local area network (LAN). The backup server is coupled to at least one storage server via another network, such as the Internet. In one embodiment, the backup data corresponds to a replication operation. In various embodiments, the backup server is configured to initiate a backup operation. Subsequent to initiation of the operation, network latency is determined for transmission of the data from the backup server to the destination server. In addition, modifications may be made to various transmission parameters that may increase overall throughput depending on the causes network latency. In various embodiments, network latency may be due to propagation delay, node delay, congestion delay, or a combination these. In response to the determination, the backup server is configured to select one of a plurality of possible transmission modes for the backup operation. Various transmission modes may have differing data chunk sizes, batch sizes, and/or a different number of streams being processed. In this manner, overall throughput, and performance, may be increased.

In various embodiments, a data source and a destination are coupled to one another via a network. The data source is configured to transmit data to the destination and determine a network latency associated with the transmission. In response to determining a first transmission parameter, such as a data packet size, may not yet be optimized, the source is configured to modify the first transmission parameter and evaluate its effect on data throughput. The source may repeat such modifications as long as throughput is increased or not decreased. Once the first transmission parameter is deemed optimized, the source may perform a similar procedure for a second transmission parameter. In such an embodiment, in response to determining a second transmission parameter, such as a number of streams being processed, may not yet be optimized, the source is configured to modify the second transmission parameter and evaluate its effect on data throughput. The source may repeat such modifications as long as throughput is increased or not decreased.

These and other embodiments will be appreciated upon reference to the following description and accompanying drawings.

Figure 1:
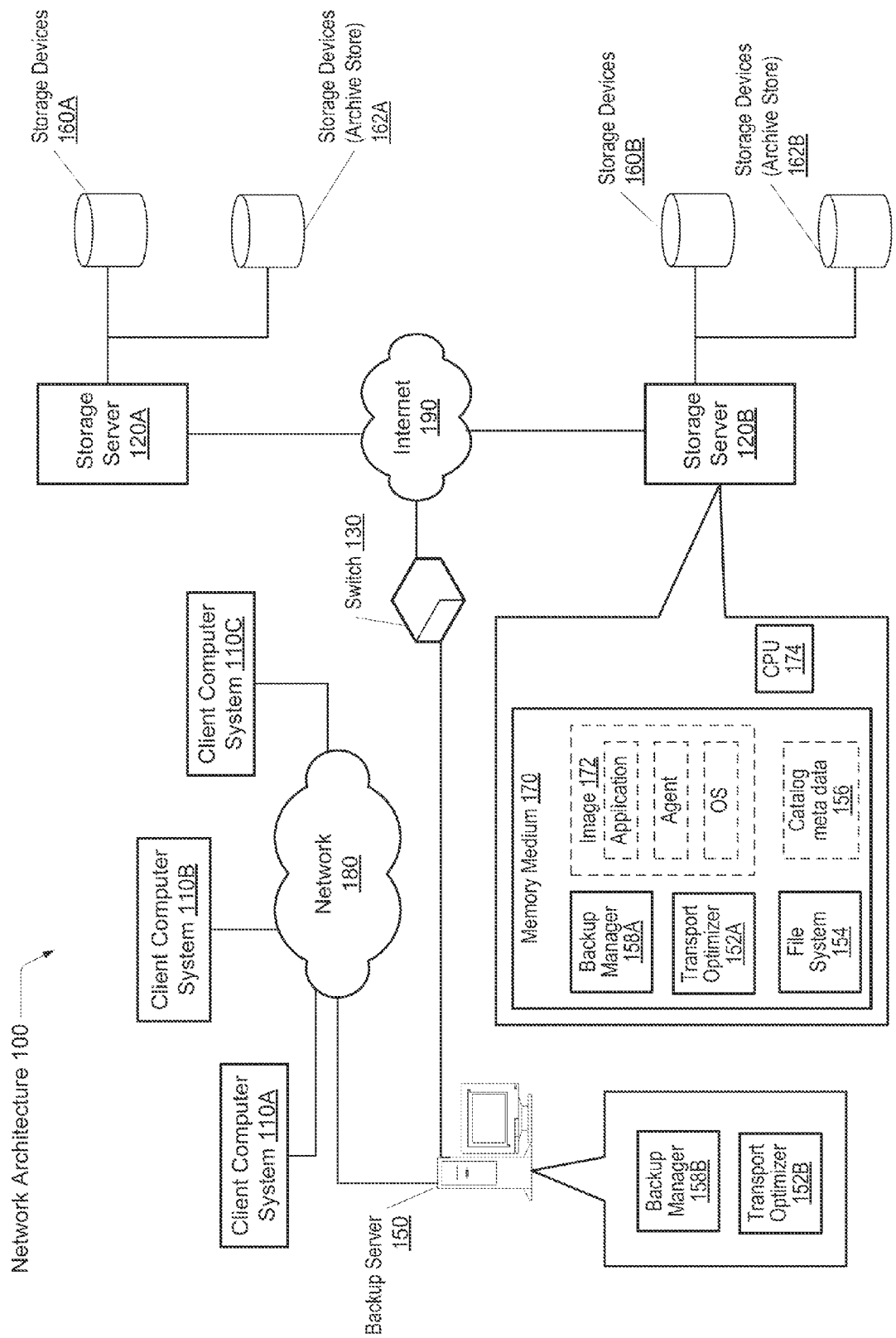
FIG. 1 is a generalized block diagram illustrating one embodiment of a network architecture.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a display pipeline . . . ." Such a claim does not foreclose the apparatus from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On", "In Response To", or "Responsive To." As used herein, these terms are used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of systems and methods for efficient transfer of data over one or more networks are described herein. Generally speaking, two storage servers may be used in a replication (or variously referred to as "duplication") operation. A first storage server referred to as an initiator, or initiating server, may execute a backup software application. For example, according to a given schedule the backup software application may direct the initiator server to transfer a backup data image on a first storage medium to a target server. The first storage medium may be coupled to the initiator server. The target server may store the received backup data image on a second storage medium coupled to the target server. In some embodiments, the transfer of the backup data from the initiator server to the target server may utilize one or more networks. These networks may have been detected and initialized by each of the initiator and the target servers.

Referring to FIG. 1, a generalized block diagram illustrating one embodiment of a network architecture 100 including a capability for efficiently transferring backup data over a network is shown. As shown, the network architecture 100 includes client computing systems 110A-110C interconnected through a local area network 180 to one another and to a backup server 150. Network 180 may include a variety of techniques including wireless connection, direct local area network (LAN) connections, wide area network (WAN) connections such as the Internet, a router, and others. Network 180 may comprise one or more LANs that may also be wireless. Network 180 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, Infiniband and so forth may be used in network 180.

Client computer systems 110A-110C are representative of any number of stationary or mobile computers such as desktop personal computers (PCs), servers, server farms, workstations, laptops, handheld computers, servers, storage servers and/or devices, personal digital assistants (PDAs), smart phones, and so forth. Generally speaking, client computer systems 110A-110C include one or more processors comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 110A-110C may include a base operating system (OS) stored within the memory hierarchy. As such, the base OS may be operable to provide various services to the end-user and provide a software framework operable to support the execution of various programs. Additionally, in some embodiments each of the client computer systems 110A-110C may include a hypervisor used to support virtual machines (VMs). As is well known to those skilled in the art, virtualization may be used in desktops and servers to fully or partially decouple software, such as an OS, from a system's hardware.

The backup server 150 may be coupled to a second network 190 through a switch 130. The network 190 may be the Internet, another outside network, or otherwise. Alternatively, or additionally, network 180 may be coupled to network 190 via one or more switches that utilize protocols associated with both networks 180 and 190. The network 180 and the backup server 150 may interface with a set of communications protocols used for the Internet such as the Transmission Control Protocol (TCP) and the Internet Protocol (IP), or TCP/IP. Switch 130 may be a TCP/IP switch.

Storage devices 160A-160B may be used to store copies of data within the network architecture 100. Storage devices 160A-160B may include or be further coupled to varieties of storage consisting of one or more hard disks, tape drives, server blades, Solid-State Disks (SSDs), or specialized devices, and may include a variety of memory devices such as RAM, Flash RAM, MEMS (Micro Electro Mechanical Systems) storage, battery-backed RAM, and/or non-volatile RAM (NVRAM), etc. Storage devices 162a-162b may be used to store copies of data stored on devices 160A-160B. Storage devices 162a-162b may comprise one or more of the memory devices listed for storage devices 160A-160B. In some embodiments, deduplication may be utilized in one or more of the storage devices in FIG. 1. to minimize the storage of redundant data and thereby reduce storage requirements.

In one embodiment, the storage servers 120A-120B in network architecture 100 may create a copy of files on client computing systems 110A-110C to protect data. In addition, a backup agent on client computing systems 110A-110B and/or backup server 150 may determine when data objects qualify to be archived. The servers 120A-120B may be accessed via the Internet network 190. Similar to network 180, protocols such as Fibre Channel, Fibre Channel over Ethernet (FCoE), iSCSI, and so forth may be used in network 190.

In another embodiment, a software layer comprising drivers within a backup manager 158A-158B may detect the capabilities of network ports in a corresponding one of the storage servers 120A-120B. In one example, this software layer may detect a Fibre Channel host bus adapter (HBA) card with 2×34-gigabyte (GB) ports. Additionally, the software layer may detect an Ethernet network card with 2×1-gigabyte ports. Therefore, the software layer may allocate 20% of the backup data traffic to the Ethernet ports and 80% of the backup data traffic to the Fibre Channel ports. In yet another embodiment, the allocation of backup data network traffic may be readjusted when a disconnection of a port is detected, when a connection of a new port is detected, and when a given port is measured to have a level of idleness above a first threshold or below a second threshold. For example, a busy port connection may be reallocated to have less of the backup data network traffic. A relatively idle port connection may be reallocated to have more of the backup data network traffic.

A web service is typically an application programming interface (API) or Web API that is accessed via Hypertext Transfer Protocol (HTTP) and may be executed by storage servers 120A-120B and backup server 150. A web service supports interoperable machine-to-machine interaction over a network. It has an interface described in a machine-process format, such as Web Services Description Language (WSDL). Storage servers 120A-120B, backup server 150 and other machines and servers not shown may communicate with each other over application programming interfaces such as web services.

The backup server 150 and the storage servers 120A-120B may include a backup application 158B. As shown for storage server 120B, this backup application 158A, or "backup manager" may comprise program instructions stored on the memory 170 and executable by the processor 174 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations, such as duplication operations. Policies for backup and duplication operations within a lifecycle may be determined for data images. For example, the policies may include determining a number of tiers in a tiered storage, a type and a number of storage media, a time duration for an image to be stored on a given storage medium, the hours of the day to block from particular operations, and so forth.

A backup system agent may assist the backup manager 158B. The backup manager 158B may be configured to create a volume image backup. In some embodiments, the backup manager 158B may receive user input directing the backup manager 158B to create a volume image backup of a specific system. In some embodiments, the backup manager 158B may create a volume image backup of a specific system automatically, e.g., the backup manager may be scheduled to perform regular backups of a specific system. As part of creating backups, the backup manager 158B may also create catalog metadata (not shown) associated with the backup data (e.g., such as catalog meta data 156).

The catalog metadata 156 created by the backup manager 158B during a backup operation may include at least one or more of the following: a data name, data size, a fingerprint of the data, a batch number, as well as data type, version number, ownership, permissions, modification time, backup segment and sub-segment identifiers, cryptography segment and sub-segment identifiers, error code, etc. A batch number may be used to identify the particular backup operation in which an associated backup entry was created. Other forms of metadata and/or identifiers will be apparent to those of ordinary skill in the art. The catalog metadata 156 may be usable for restore browsing, e.g., at a later time. For example, the data layout of stored information in backup storage devices 160A-160B and archive stores 162a-162b may be stored in the catalog 156.

In one embodiment, a file system 154 may be used to provide a special-purpose database for the storage, organization, manipulation, and retrieval of data. File system 154 may provide access to data by operating as clients for a network protocol. Alternatively, file system 154 may be virtual and exist only as an access method for virtual data. In one embodiment, the backup server 150 comprises a file system 154, but the storage servers 120A-120B do not.

In addition to the above, FIG. 1 illustrates a transport optimizer 152a-152B that may be utilized during transport of data across a network. For example, during movement of backup data by backup server 150 across network 190, transport optimizer 152B may used. In various embodiments, as will be described in greater detail below, transport optimizer may monitor latencies associated with the transport of data across the network. In response to various detected conditions, the transport optimizer 152B may cause changes in how the data is transmitted in an effort to increase overall throughput. In various embodiments, functions described herein in relation to data transmission and optimization may be embodied in hardware, software, or a combination of the two.

It is noted that in alternative embodiments, the number and type of client computers and servers, switches, networks and shared storage is not limited to those shown in FIG. 1. At various times one or more clients may operate offline. In addition, during operation, individual client computer connection types may change as users connect, disconnect, and reconnect to network architecture 100.

Figure 2:
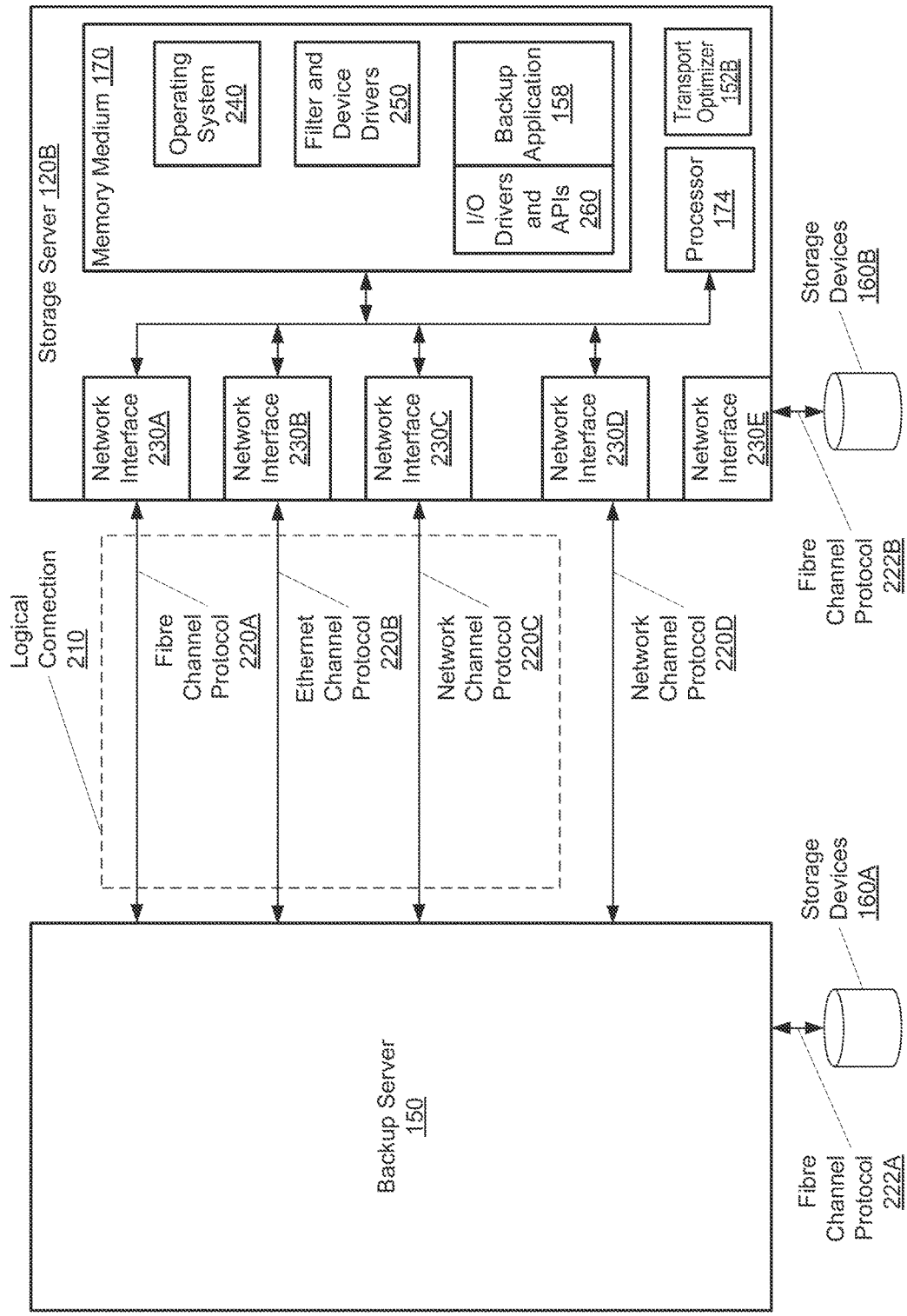
FIG. 2 is a generalized block diagram illustrating one embodiment of a computing network.

Turning now to FIG. 2, a generalized block diagram of one embodiment of a communication channel between two servers is shown. Hardware and software components that correspond to those of FIG. 1 are numbered identically. Various components are generally described with reference to storage server 120B, though it is to be understood that server 150 may have similar components. Memory medium 170 comprises a base OS 240, one or more OS filter drivers and device drivers 250, and one or more other software applications, such as backup application 158. A software layer may include input/output (I/O) drivers and I/O APIs 260. It is noted that the depicted software components may be paged in and out of a main memory in a conventional manner from a storage medium such as a hard drive (not shown). Each of storage servers 120A-120B may be coupled to storage devices 160A-160B, respectively, through one of respective Fibre Channel connections 222A-222B.

A single logical communication channel 210 may comprise one or more available networks. For example, networks 220A-220C may be included in the logical communication channel 210. As shown, at least a Fibre Channel protocol 220A, an Ethernet protocol 220B and another network protocol 220C (not specified) are within the logical communication channel 210. Networks corresponding to the protocols 220A-220C may be used for data transfer, such as for a duplication operation. Another network channel protocol 220D is shown that is not included in the logical communication channel 210.

The software in component 260, which may also include network proxy logic, may be used during network initialization and during packet handling procedures. This functionally may additionally include network protocol login steps, host identifier generation, packet conversion and packet tracking. This functionality may be implemented in hardware such as ASICs, in software, or both. A portion or all of this functionality may also be placed in a corresponding one of network interfaces 230A-230e. This functionality may include Berkeley (BSD) sockets, or socket APIs. These socket APIs may allow network access, such as a connection-oriented approach, whereby TCP maintains a channel between the initiator storage server and the target storage server. This connection-oriented approach may also be referred to as a session-oriented approach. Socket APIs identify specific processes running on a machine that is accessible via an IP connection. By giving each service process running on a machine a "port"—a numeric value used to identify the process—a client application can distinguish between, say, a file transfer service and a Web service. Therefore, a message may be sent to a specific software process, which is an end point for the communication.

Figure 3:
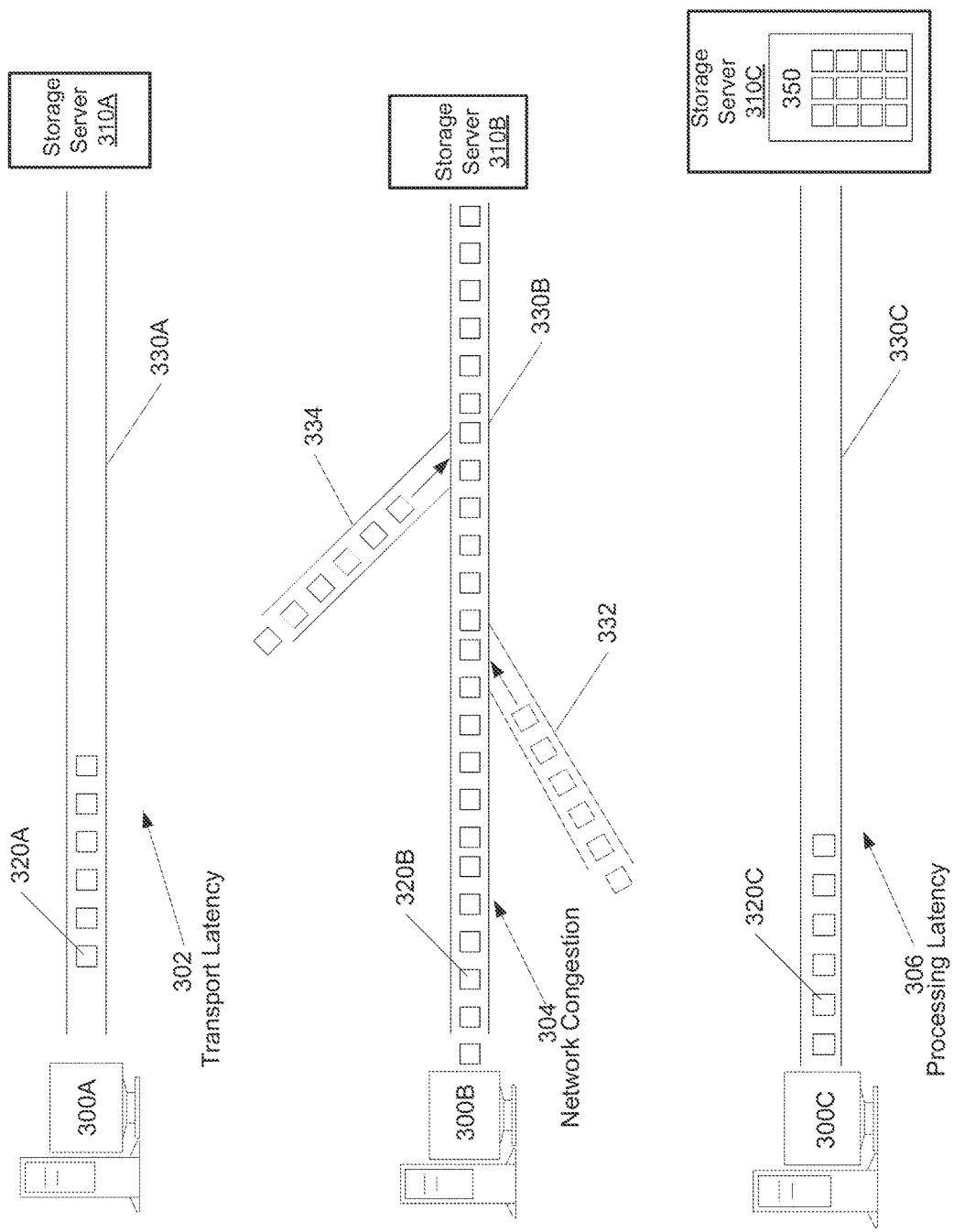
FIG. 3 is a generalized flow diagram illustrating one embodiment of various causes of network latency.

Turning now to FIG. 3, different scenarios are presented that describe various causes of network latency. As mentioned above, increased network latencies reduce overall throughput of data. There are, however, different causes for network latency. For example, scenario 302 in FIG. 3 provides an example of transport latency. Generally speaking, transport latency refers to the latency of communication due to the distance being travelled. In other words, given a transport speed, it will take a minimum amount of time to traverse a given distance. In the example shown, a first server 300A is coupled to a second server 310A via a network 330. Server 300A is conveying data in the form of packets 320A to server 310A via the network 330. For example, the data 320A conveyed may represent backup data, duplication data, or otherwise. In one embodiment, each of the packets of data 320A has a given size. Additionally, when storage server 310A receives one or more packets 320A, the server 310A may provide a response (e.g., an acknowledgement) to server 300A that confirms the data has been received. In this manner, the source server 300A is able to keep track of what data has already been sent and correctly received by the destination server 310A. If an acknowledgement is not received by the server 300A, server 300A may re-convey data packets 320A for which an acknowledgement has not been received. In addition, server 310A may sometimes receive a given packet, but the packet is determined to have one or more errors. In such a case, the server 331A may respond to the server 300A with an indication advising of the error and the server 300A may re-convey the packet(s) in question.

In such an embodiment as described above, server 300A may be configured to convey a particular number of packets 320A within a given time frame (e.g., per second) and then wait for an acknowledgment of their receipt by server 310A before sending further packets. Consequently, the minimum latency for conveying a packet 320A and receiving an acknowledgement of its receipt is a function of the distance travelled (e.g., the length of the communication channel 330) and the transmission speed of the channel 330 (i.e., the round trip time, RTT). As one example, a customer may use storage area network (SAN) based replication for its data. For example, they may seek to replicate data between two data storage locations (data stores). In one embodiment, the channel 330 may utilize long distance Fibre Channel between the two locations and the round trip time may be 50 ms. In the embodiment, the conveying server is configured to transmit up to 20 packets per second, with each packet being 64 KB (e.g., the TCP protocol may be used). Accordingly, the throughput will be approximately 20×64 KB, or 1.3 MB/second. However, if the receiving server 310A is capable of supporting a 300 MB/second, the performance is less than $1/200^{th}$ of its capability which may be considered unacceptable.

As another example, scenario 304 in FIG. 3 illustrates network latencies due to network congestion. Generally speaking, network congestion refers to a condition in which communications are delayed due to the large amount of data traversing the communication channel. In the example shown, server 300B is conveying packets of data 320B to server 310 via channel 330. As shown in the example, packets 332 and 334 from other locations are also being conveyed via network/channel 330. These other sources of packets may be other devices coupled to network 330, other networks coupled to network 330, or otherwise. In any event, what can be seen is the number of packets on network 330 is relatively large. In such a case, the round trip time for packets conveyed from server 300B may be increased as they must compete for bandwidth with all of the other packets 332, 334. In other words, servicing of a given packet must wait some period of time for other packets ahead of the given packet to be serviced. This "wait" period causes an increase in latency.

Finally, FIG. 3 illustrates a third scenario 306 that depicts network latency due to processing. Generally speaking, processing latency refers to latencies due to the time it takes a receiving device to process received data. In this case, server 300C is conveying packets 320C via network 330 to server 310C. Server 310C is shown to have received and buffered numerous packets 350 that have yet to be processed. In this case, a packet 320C arriving from server 300C will not be processed right away, but will be buffered and processed after other packets that preceded it. This "processing" delay within the receiving server 310C increases the time it takes for an acknowledgement to be generated and conveyed to server 300C. Therefore, the round trip time is increased due to the added processing time. As may be appreciated, each of the scenarios depicted in FIG. 3 may exist at any given time in various combinations.

Figure 4:
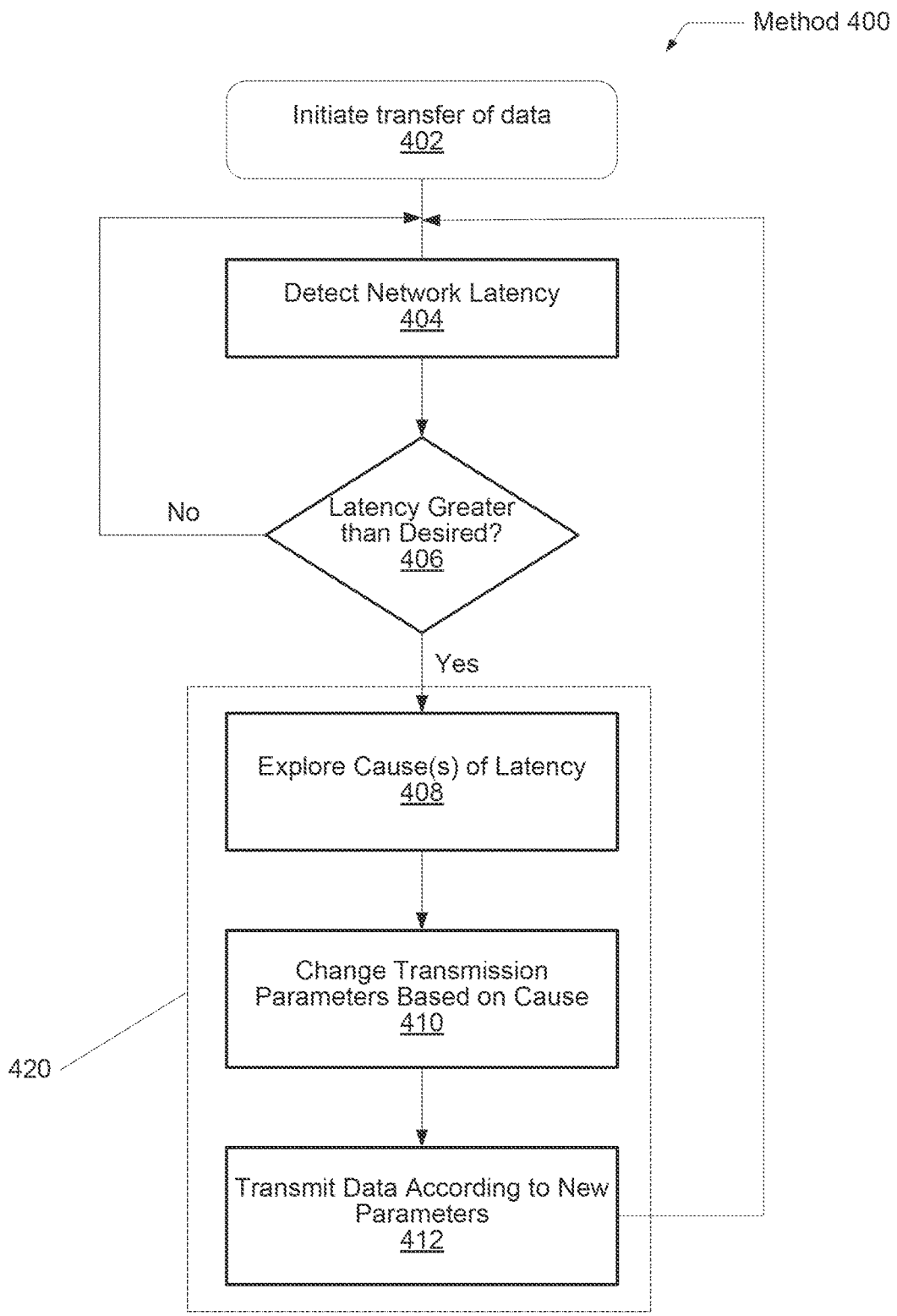
FIG. 4 is a generalized block diagram illustrating one embodiment of a method for managing data transmission in a network environment.

Turning now to FIG. 4, a generalized flow diagram illustrating one embodiment of a method 400 for determining a cause of network latency and managing the transmission of data. As discussed above, data may be transmitted from a source device to a destination device across a network or other communication channel. Such data may correspond to backup data, mirrored data, or any other transmission of data from one location to another. In the example shown, the transfer/transmission of data is initiated (block 402). Subsequent to transmission of data, a determination is made regarding network latencies. For example, a latency may be determined from the time given data is transmitted from the source (e.g., a packet of data) to the time an acknowledgement of some kind regarding receipt of the data by a destination is received by the source (e.g., a round trip time). In various embodiments, latencies may be determined for individual packets, multiple packets, blocks of packets (e.g., a block of 20 packets, or otherwise. Additionally, or alternatively, an average latency may be determined for a given amount of data (e.g., a given number of packets). Numerous possibilities for determining latencies are possible and are contemplated.

Subsequent to determining the latency, a determination is made as to whether the latency is greater than desired (block 406). For example, the source may be programmable to with one or more values or thresholds that may be compared to a determined latency. Depending on how the determined latency compares, an optimization procedure may be initiated. In one embodiment, if the latency meets a given condition (e.g., is greater than some threshold), an optimization procedure may be initiated (e.g., continuing to block 408). However, if the latency does not meet such a condition, then the method may return to block 404 where latency detection is repeated. In other embodiments, the source may be programmable to simply discontinue optimization efforts for a given data transfer job, or wait a given period of time before repeating the above discussed latency detection and comparison.

If the latency is greater than desired (block 406), then a cause of the latency may be explored (block 408). In various embodiments, the actual cause of a network latency may be inferred as opposed to explicitly determined. For example, depending on how the network latency changes in response to changes in how the data is transmitted, certain causes of the latency may be inferred. As an example, if data throughput increases as the data transmission rate is increased, then it may be inferred that the latency is largely one of transport latency (i.e., propagation delay). This may be true because a processing or congestion related latency may generally increase if the data transmission rate is increased. Whatever the true cause of the latency, selective efforts may be undertaken to optimize the data transmission parameters to improve overall performance. Having explored the latency by varying transmission parameters, new transmission parameters are adopted (block 410) and used for transmission of the data (412). Such parameters may include packet size, the number of streams processed, or other parameters than change the rate at which data is transmitted. In the present discussion, two parameters are generally discussed, packet size and number of streams. However, any other number of parameters may be used. Additionally, while the following discussion describes changing parameters in a given order, parameters may be modified in an order different from that described. Numerous such alternatives are possible and are contemplated.

Figure 5:
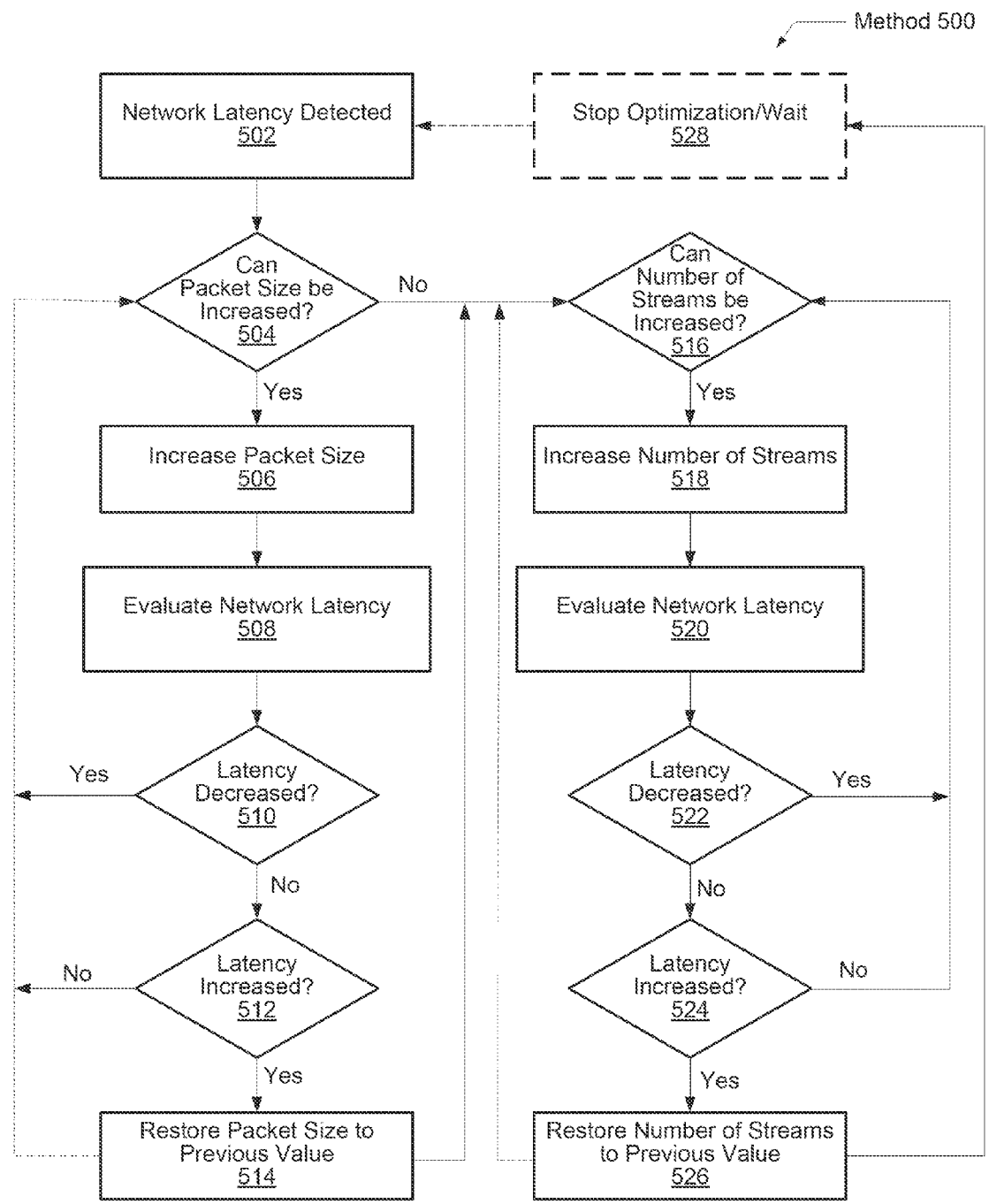
FIG. 5 is a generalized flow diagram illustrating one embodiment of a method for optimizing data transmission in a network environment.

In the example of FIG. 4, block 420 generally corresponds to an optimization procedure that seeks to improve overall performance. Generally speaking, improved performance corresponds to an increase in overall throughput of data. FIG. 5 illustrates one embodiment of a method 500 for performing such an optimization. In the embodiment shown, a network latency is detected (block 502). As discussed, this may correspond to an average, particular packets, or otherwise. Having determined the network latency, in an embodiment in which data is transmitted as packets, a determination is made as to whether the packet size may be increased. Depending on the transmission protocol, various parameters may be used to adjust the size of data packets or otherwise scale the amount of data conveyed in a given period of time.

After increasing the packet size (block 506), the network latencies are evaluated. In particular, network latency is observed in response to the change in packet size to see if it increases, decreases, or presents no change. If the network latency decreases (block 510), then the change in packet size may be deemed desirable as throughput has increased without increasing latencies. In such a case, the method may return to block 504 to consider whether further packet size increases are possible. If, in block 510), the latency is not decreased a determination is made as to whether it has increased or remained roughly the same (unchanged). If the latency has not increased (i.e., the latency is generally unchanged), then the method may continue with block 504 as before. However, if the latency has increased in response to the size parameter change (block 512), then the change may be deemed undesirable and the previous packet size may be restored (block 514). In various embodiments, rather than immediately restoring the previous packet size (block 514), a determination may be made as to whether the overall throughput would increase with the larger packet size—despite the increased latency. If so, then the current packet size may be retained. Such an option, whether to simply restore the previous packet size or not depending on throughput, may be programmable at the source. Additionally, in some embodiments the method may return to block 504 (via the dashed line) to indicate it may try even larger size packets in spite of increased latency. Such an approach may be used in cases where throughput may still be increased. In other embodiments, the method may simply move from block 514 to block 516. Moving to block 516 occurs when the packet size has been effectively deemed optimized.

In block 504, if the packet size cannot be increased (e.g., it has reached a maximum size or cannot otherwise be increased), then a determination may be made as to whether the number of streams currently being processed at the source can be increased. For example, in some embodiments a given stream may be processed at the source. When data for a given stream is transmitted by the source, there is a particular latency for receiving an acknowledgement of some kind from the destination. In some embodiments, a source may send a given amount of data (e.g., 20 packets) for a given stream, and wait for an acknowledgement before sending more data. In an effort to increase throughput, more streams may be processed by the source at a given time. For example, which waiting for an acknowledgement corresponding to a first stream of data, the source may process a second stream and transmit data while waiting. In this manner, the time the source spends waiting for the acknowledgement(s) may be used more productively. However, simply increasing the number of streams without regard to its effects on network latency may not be a good course of action. As such, the method of FIG. 5 illustrates how to optimize the number of streams based on network latency evaluation.

In the example of FIG. 5, if the number of streams can be increased (block 516), the number of streams is increased (block 518) and an evaluation of its effect on network latencies is determined (block 522). If latency decreases, then this process may be continued by returning to block 516 as throughput has increased. In such a case, it may not be the case that the reduced latency is a result of the increased number of streams. However, since the throughput has increased, the approach is considered successful. If the latency has not decreased (block 522) and has not increased (block 524), then throughput has been increased without worsening the latency. In such a case, the change in parameter (i.e., the number of streams) may be considered successful and possible repeated by returning to block 516. However, if the latency has increased (block 526), then the change in parameter may be deemed unsuccessful and the previous value restored. As discussed in relation to block 514, rather than simply restoring the previous parameter value, the overall throughput may be determined to see if it has increased in spite of the increased latency. If the throughput has increased, the new parameter may be retained. In some embodiments, if the throughput has increased in spite of an increased latency, then blocks 514 and/or 526 could potentially return to attempt an increase in packet size and/or number of streams.

At some point in the method of FIG. 5, it is determined that the parameter changes are not improving throughput (i.e., the number of streams is deemed optimized) and the process may complete at block 528. In various embodiments, the optimization procedure may simply stop for the current data transfer or it may be retried periodically. Alternatively, it may be revisited if the network latency is detected to have reached a particular threshold. Numerous alternative embodiments are possible and are contemplated. In some embodiments, the source may have knowledge of the capabilities of a given source (e.g., how much throughput it is capable of handling) and seek to optimize the data transmission with that capability in mind. For example, if it is known that the destination of only capable of handling a data throughput of 100 Mbsec, then the source will not continue efforts to increase throughput above that. Knowledge of the destination capabilities may be known in advance (e.g., the target/destination is part of the same enterprise) or a communication protocol may be established that exchanges this information between a source and destination. In some cases, the destination may be capable of greater throughput, but due to other activities it wishes to limit the data transfer to some value less than its capability. These and other embodiments are possible and are contemplated.

Figure 6:
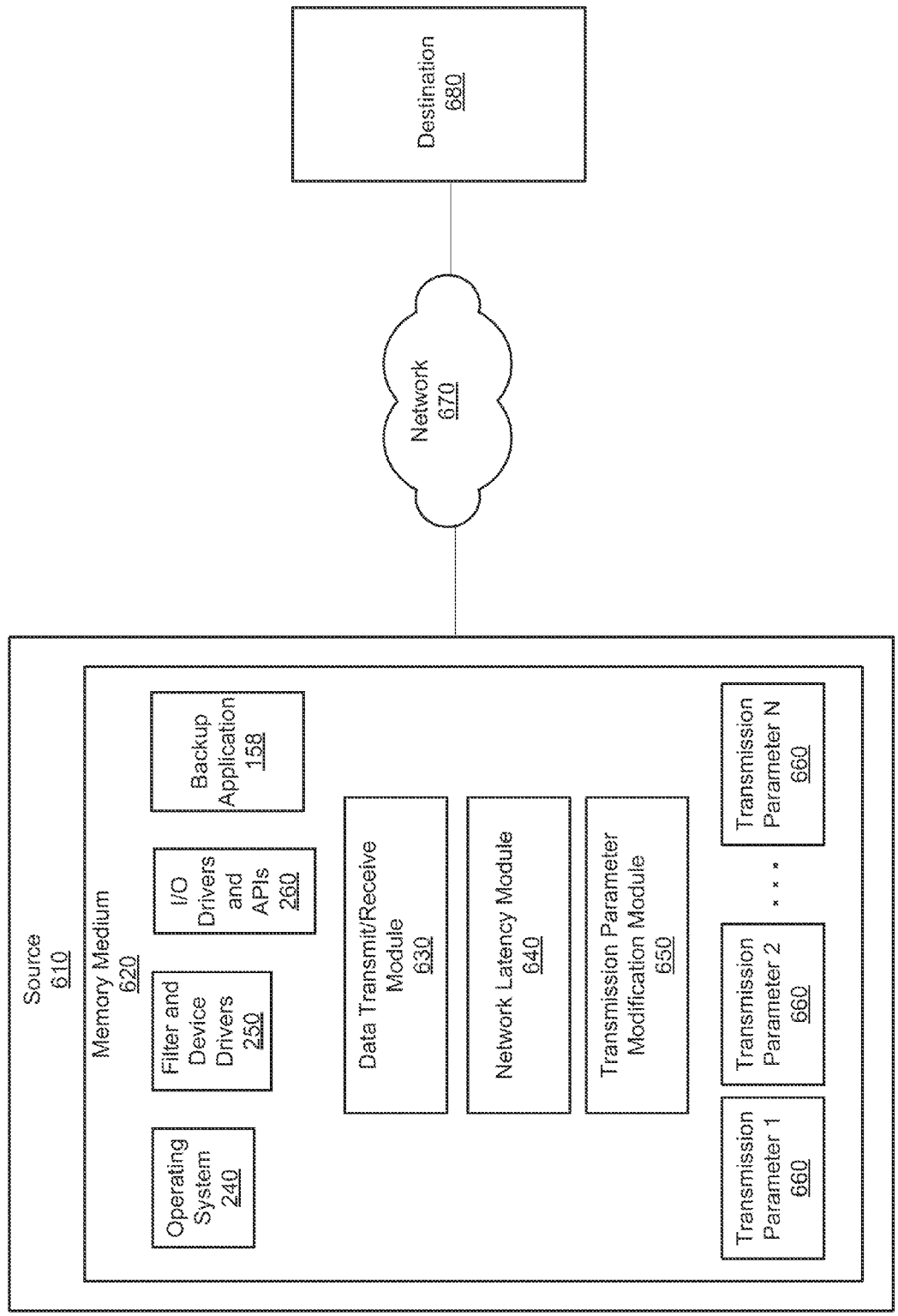
FIG. 6 illustrates one embodiment of a system depicting various modules for use in optimizing network data transmission.

Turning now to FIG. 6, one embodiment of a system is shown that couples a data source 610 to a destination 680 via a network 670. In the example shown, the data source 610 is shown to include a memory medium 620 (e.g., volatile and/or non-volatile) that stores program instructions. For example, similar to FIG. 2, the memory medium is shown to include programs and/or instructions corresponding to an operating system 240, drivers 250 and 260, and a backup application 158. Also shown are various program modules associated with the foregoing description. For example, a module 630 is shown that is configured to transmit and receive data across the network 670, and network latency module 640 is shown that is configured to detect or determine network latencies associated with data transmissions, and a transmission parameter modification module 650 is shown that is configured to modify transmission parameters such as packet size, number of streams processed, or otherwise. Also shown are transmission parameters 1-N which generally illustrate stored parameters that affect the transmission of data, such as packet size, number of streams, and so on. It is noted that the destination 680 may be configured with one or more of the components and/or modules shown included in the source. Additionally, in various embodiments, some of the functions described above as being performed by the source may be performed by the destination. For example, the destination may provide a suggested parameter modification. Numerous such alternatives are possible and are contemplated.

It is noted that the above-described embodiments may comprise software. In such an embodiment, program instructions and/or a database (both of which may be referred to as "instructions") that represents the described systems and/or methods may be conveyed or stored on a computer readable medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB)

interface, etc. Storage media may include microelectromechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for optimizing data transmission in a computer network, the method comprising:
    initiating a data backup operation to backup data from a source to a destination, wherein said operation comprises:
        determining a network latency associated with transmission of data from a source to a destination via a network;
        in response to determining a first transmission parameter for transmitting data on the network is not optimized, wherein the first transmission parameter corresponds to a data packet size, repeatedly performing:
            modifying the first transmission parameter by increasing the data packet size;
            transmitting data using the first transmission parameter as modified;
            determining a network latency associated with the transmitting of data using the first transmission parameter as modified;
            in response to determining the network latency has decreased, deeming the first transmission parameter to be optimized if the data packet size cannot be increased without reducing throughput;
            in response to determining the network latency has increased, restoring the data packet size to a previous size at the source and deeming the first transmission parameter to be optimized;
        in response to determining the first transmission parameter is optimized, determining whether a second transmission parameter is optimized, wherein the second transmission parameter corresponds to a number of streams processed by the source;
        in response to determining the second parameter transmission parameter is not optimized, repeatedly performing an optimization process for the second transmission parameter.

2. The method as recited in claim 1, wherein repeatedly performing the optimization process comprises repeatedly performing:
    modifying the second transmission parameter for transmitting data on the network by increasing the number of streams;
    transmitting data using the second transmission parameter as modified;
    determining a network latency using the second transmission parameter as modified;
    in response to determining the network latency has decreased, deeming the second transmission parameter to be optimized if the number of streams has either reached a maximum value or cannot be increased without reducing throughput; and
    in response to determining the network latency has increased, restoring the number of streams to a previous number and deeming the second transmission parameter to be optimized.

3. The method as recited in claim 1, wherein in response to determining a network throughput has reached a given threshold, both the first transmission parameter and second transmission parameter are deemed optimized.

4. The method as recited in claim 3, wherein the given threshold is provided to the source by the destination.

5. The method as recited in claim 4, wherein the given threshold represents a maximum throughput the destination is capable of handling.

6. The method as recited in claim 4, wherein the given threshold is less than a maximum throughput the destination is capable of handling.

7. The method as recited in claim 1, wherein determining a network latency comprises conveying given data from the source to the destination, receiving an acknowledgment at the source from the destination corresponding to the given data, and determining an amount of time elapsed between conveying the given data and receiving said acknowledgment.

8. A computing system comprising:
    a first computing device;
    a second computing device; and
    a network coupling the first computing device to the second computing device;
    wherein the first computing device is configured to:
    initiate a data backup operation to backup data from a source to a destination, wherein said operation comprises:
        determine a network latency associated with transmission of data from a source to a destination via a network;
        in response to determining a first transmission parameter for transmitting data on the network is not optimized, wherein the first transmission parameter corresponds to a data packet size, the first computing device is configured to repeatedly:
            modify the first transmission parameter by increasing the data packet size;
            transmit data using the first transmission parameter as modified;
            determine a network latency associated with the transmitting of data using the first transmission parameter as modified;
            in response to determining the network latency has decreased, deem the first transmission parameter to be optimized if the data packet size cannot be increased without reducing throughput;

in response to determining the network latency has increased, restore the data packet size to a previous size at the source and deeming the first transmission parameter to be optimized;

in response to determining the first transmission parameter is optimized, determine whether a second transmission parameter is optimized, wherein the second transmission parameter corresponds to a number of streams processed by the source;

in response to determining the second parameter transmission parameter is not optimized, repeatedly perform an optimization process for the second transmission parameter.

9. The computing system as recited in claim 8, wherein to repeatedly perform the optimization process, the first computing device is configured to repeatedly:

modify the second transmission parameter for transmitting data on the network by increasing the number of streams;

transmit data using the second transmission parameter as modified;

determine a network latency using the second transmission parameter as modified;

in response to determining the network latency has decreased, deem the second transmission parameter to be optimized if the number of streams has either reached a maximum value or cannot be increased without reducing throughput; and in response to determining the network latency has increased, restore the number of streams to a previous number and deeming the second transmission parameter to be optimized.

10. The computing system as recited in claim 8, wherein in response to determining a network throughput has reached a given threshold, both the first transmission parameter and second transmission parameter are deemed optimized.

11. The computing system as recited in claim 10, wherein the given threshold is provided to the source by the destination.

12. The computing system as recited in claim 11, wherein the given threshold represents a maximum throughput the destination is capable of handling.

13. The computing system as recited in claim 11, wherein the given threshold is less than a maximum throughput the destination is capable of handling.

14. The computing system as recited in claim 8, wherein to determine a network latency the first computing device is configured to convey given data to the second computing device, receive an acknowledgment from the second computing device corresponding to the given data, and determine an amount of time elapsed between conveying the given data and receiving said acknowledgment.

15. A non-transitory computer-readable storage medium storing program instructions, wherein the program instructions are executable to:

initiate a data backup operation to backup data from a source to a destination, wherein said operation comprises:

determining a network latency associated with transmission of data from a source to a destination via a network;

in response to determining a first transmission parameter for transmitting data on the network is not optimized, wherein the first transmission parameter corresponds to a data packet size, repeatedly performing:

modifying the first transmission parameter by increasing the data packet size;

transmitting data using the first transmission parameter as modified;

determining a network latency associated with the transmitting of data using the first transmission parameter as modified;

in response to determining the network latency has decreased, deeming the first transmission parameter to be optimized if the data packet size cannot be increased without reducing throughput;

in response to determining the network latency has increased, restoring the data packet size to a previous size at the source and deeming the first transmission parameter to be optimized;

in response to determining the first transmission parameter is optimized, determining whether a second transmission parameter is optimized, wherein the second transmission parameter corresponds to a number of streams processed by the source;

in response to determining the second parameter transmission parameter is not optimized, repeatedly performing an optimization process for the second transmission parameter.

16. The non-transitory computer-readable storage medium as recited in claim 15, wherein repeatedly performing the optimization process comprises repeatedly performing:

modifying the second transmission parameter for transmitting data on the network by increasing the number of streams;

transmitting data using the second transmission parameter as modified;

determining a network latency using the second transmission parameter as modified;

in response to determining the network latency has decreased, deeming the second transmission parameter to be optimized if the number of streams has either reached a maximum value or cannot be increased without reducing throughput; and in response to determining the network latency has increased, restoring the number of streams to a previous number and deeming the second transmission parameter to be optimized.

17. The non-transitory computer-readable storage medium as recited in claim 15, wherein in response to determining a network throughput has reached a given threshold, the program instructions are executable to deem both the first transmission parameter and second transmission parameter are optimized.

18. The non-transitory computer-readable storage medium as recited in claim 17, the given threshold is provided to the source by the destination.

19. The non-transitory computer-readable storage medium as recited in claim 18, wherein the given threshold represents a maximum throughput the destination is capable of handling.

20. The non-transitory computer-readable storage medium as recited in claim 18, wherein the given threshold is less than a maximum throughput the destination is capable of handling.

* * * * *